US011293336B2

(12) United States Patent
Basmaji et al.

(10) Patent No.: US 11,293,336 B2
(45) Date of Patent: Apr. 5, 2022

(54) LIQUID AND/OR GASEOUS FUEL DELIVERY SYSTEM AND METHODS THEREOF

(71) Applicant: Ford Global Technologies, LLC, Dearborn, MI (US)

(72) Inventors: Joseph F. Basmaji, Waterford, MI (US); Christopher Donald Wicks, Allen Park, MI (US); Mark Meinhart, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 16/811,945

(22) Filed: Mar. 6, 2020

(65) Prior Publication Data

US 2021/0277820 A1  Sep. 9, 2021

(51) Int. Cl.
| | | |
|---|---|---|
| *F02B 19/08* | (2006.01) | |
| *F02B 19/02* | (2006.01) | |
| *F02B 19/12* | (2006.01) | |

(52) U.S. Cl.
CPC .............. *F02B 19/08* (2013.01); *F02B 19/02* (2013.01); *F02B 19/12* (2013.01)

(58) Field of Classification Search
CPC ........ F02B 19/12; F02B 19/108; F02B 19/18; F02B 19/1014; F02B 19/16; F02B 19/00; F02B 19/08; F02B 19/1009; F02B 19/1085; F02B 19/10; F02B 19/1004; F02B 19/1023; F02B 19/1095; F02B 19/14; F02B 19/02; F02B 19/06; F02B 19/1019; F02B 19/1028; F02B 19/1057; F02B 19/165; F02B 19/1033; F02B 19/1038; F02B 19/1052; F02B 19/109

USPC ....... 123/209, 250, 251, 252, 253, 254, 255, 123/256, 257, 258, 259, 260, 261, 262, 123/263, 264, 265, 266, 267, 268, 269, 123/270, 271, 272, 273, 274, 275, 276, 123/277, 278, 280, 281, 282, 283, 284, 123/285, 286, 287, 288, 289, 290, 291, 123/292, 293

See application file for complete search history.

(56) References Cited

U.S. PATENT DOCUMENTS 6,295,965 B1 * 10/2001 Firey ..................... F02B 17/005
                                                                                          123/250
7,373,931 B2    5/2008 Lennox et al.
(Continued)

FOREIGN PATENT DOCUMENTS

WO           2015138987 A1    9/2015

*Primary Examiner* — Sizo B Vilakazi
(74) *Attorney, Agent, or Firm* — Geoffrey Brumbaugh; McCoy Russell LLP

(57) ABSTRACT

Methods and systems are provided for reducing wall-wetting and improving mixing of air and fuel within a pre-chamber system of an engine. In one example, a method comprises supplying an air flow to the pre-chamber system via an air injector system while a piston associated with a main chamber is undergoing reciprocating motion. In this way, a rotating or swirling flow of fuel exiting a pre-chamber fuel injector of the pre-chamber system may be induced, which may reduce wall-wetting and improve air and fuel mixing, and when fuel is not being injected to the pre-chamber system the air flow may pressurize the pre-chamber system to reduce an amount of residuals from the main chamber to the pre-chamber system.

20 Claims, 9 Drawing Sheets

(56) References Cited

U.S. PATENT DOCUMENTS

2016/0230645 A1* 8/2016 Schock .................. F02B 19/06
2018/0135506 A1* 5/2018 Grover, Jr. ............ F02B 19/108

* cited by examiner

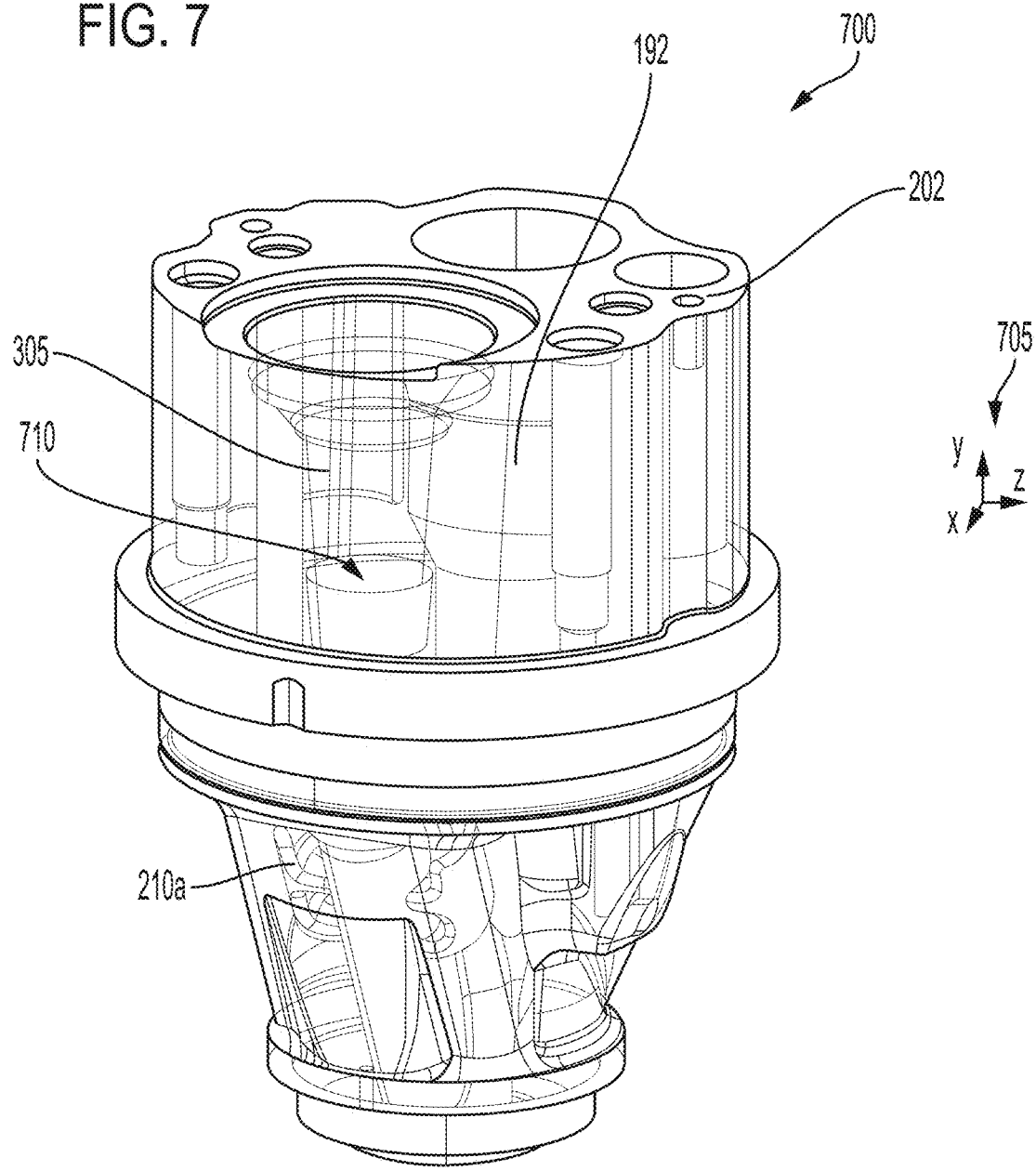

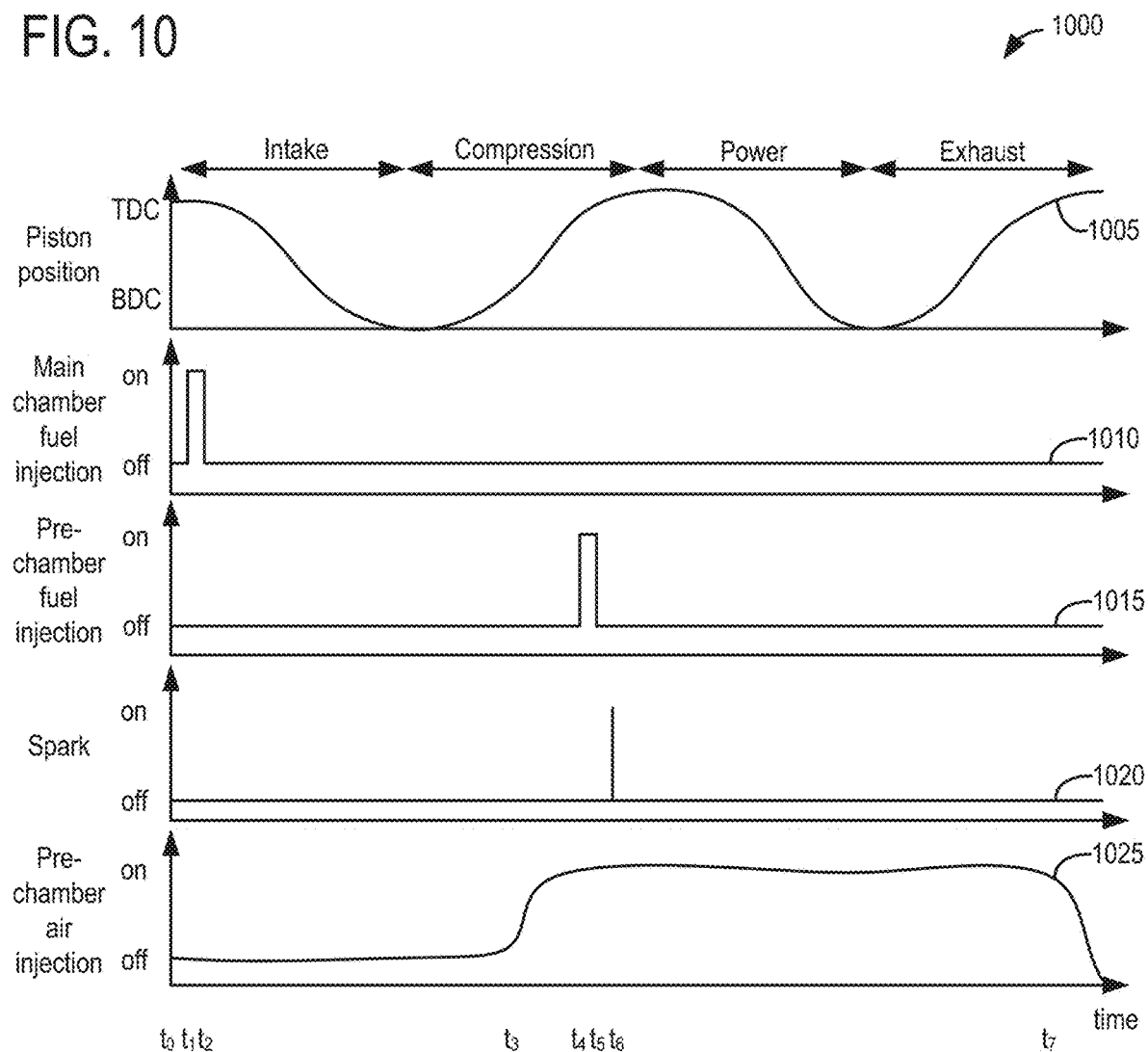

LIQUID AND/OR GASEOUS FUEL DELIVERY SYSTEM AND METHODS THEREOF

FIELD

The present description relates generally to fuel delivery systems that include pre-chamber ignition.

BACKGROUND/SUMMARY

Internal combustion engines may include components including an engine block, one or more cylinders, cylinder heads associated with the engine block, and pistons that undergo reciprocal motion within the cylinder(s). Movement of the pistons generated from the combustion of fuel within engine cylinder(s) during engine operation rotates a connecting rod, which in turn rotates a crankshaft.

In addition to the components mentioned above, some engine systems may include pre-chambers where a small charge of fuel is ignited and then used to ignite the main charge in the main combustion chamber. There are a number of known pre-chamber designs and arrangements, however internal combustion engines having pre-chambers have not to date been widely commercially accepted in the automotive industry, typically because of drawbacks such as higher costs and complexity, without other significant advantages in terms of fuel economy, emissions reduction, etc.

Specifically, future passenger car combustion engines may be expected to realize efficiencies and emission standards that are far beyond current engine technology means. Pre-chamber ignition creates flame jets that act as multiple ignition sources and simultaneously increase turbulence. In contrast to a conventional spark plug, pre-chamber ignition complements several fuel-saving combustion processes that decelerate combustion or lack turbulence, such as exhaust gas recirculation (EGR) for example. However, current pre-chamber technologies are limited to specific engine operating conditions, thereby limiting introduction on a broad scale. The active pre-chamber increases the dilution capability of the entire combustion process beyond current limits.

The inventors have herein recognized the above-mentioned issues, and have developed systems and methods to at least partially address them. In one example, a method comprises supplying an air flow to a pre-chamber system of an engine via an air injector system at a first predetermined time while a piston of a main chamber of the engine is undergoing reciprocating motion. The pre-chamber system may include a pre-chamber fuel injector and a spark plug for igniting an air-fuel mixture within the pre-chamber system, and one or more pre-chamber orifices that fluidically couple the pre-chamber system to the main chamber. In this way, the air flow may introduce a swirling or rotating pattern of flow to fuel injected to the pre-chamber system via the pre-chamber fuel injector, which may serve to improve air-fuel mixing and which may further serve to reduce wall-wetting within the pre-chamber system. Furthermore, under conditions where fuel is not being injected via the pre-chamber fuel injector, the air flow supplied to the pre-chamber system may be used to pressurize the pre-chamber system, which may reduce a flow of residuals from the main chamber to the pre-chamber system, thereby increasing a lifetime of the pre-chamber system and associated components.

As one example, supplying the air flow may comprise controlling a duty cycle of an air injection control valve included in an air injector line of the air injector system.

As another example, the method may include supplying a first fuel to the main chamber via a main chamber fuel injector at a second predetermined time while the piston of the main chamber is undergoing reciprocating motion. In such an example, the method may include supplying the first fuel via port injection to the main chamber, in some examples. In other examples, the method may include supplying the first fuel via direct injection to the main chamber. In some examples, the first predetermined time may include a time when fuel injection via one or both of the pre-chamber fuel injector and the main chamber fuel injector is discontinued.

As another example, the method may include supplying a second fuel to the pre-chamber system via the pre-chamber fuel injector at a third predetermined time while the piston of the main chamber is undergoing reciprocating motion. The first predetermined time may be within a threshold time before the third predetermined time. The air flow may continue to be supplied at the third predetermined time when the second fuel is supplied to the pre-chamber system via the pre-chamber fuel injector, in some examples. In some examples, the method may include supplying the second fuel at a predetermined angle with respect to a central axis of the pre-chamber fuel injector.

As yet another example, the method may further comprise providing a spark to the pre-chamber system at a fourth predetermined time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 depicts a profile view of a pre-chamber housing of the present disclosure, illustrating a positioning of an air injector and an air supply line;

FIG. 10 depicts a prophetic example timeline for controlling fuel and air injection according to the present disclosure.

DETAILED DESCRIPTION

Figure 1:
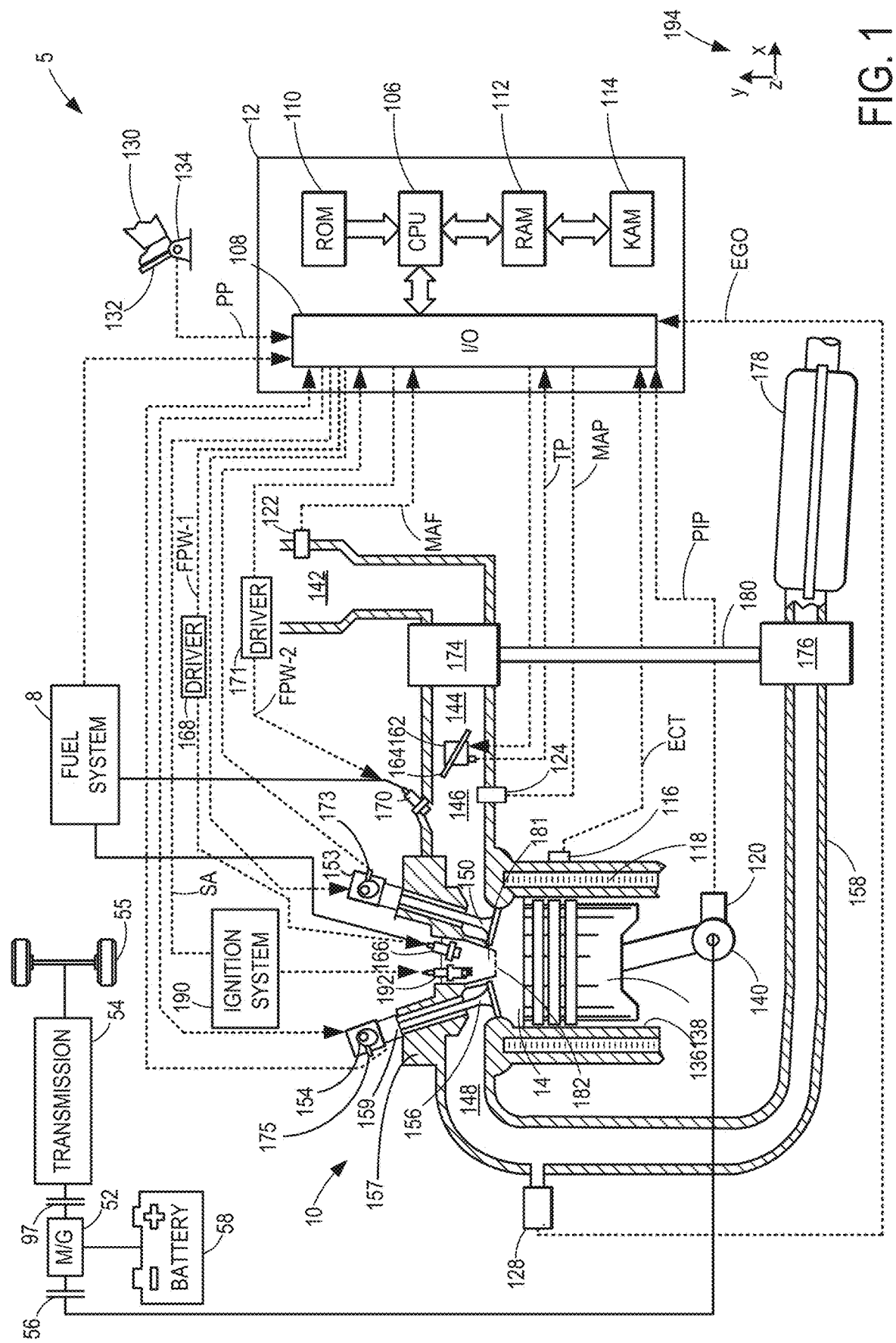
FIG. 1 depicts an example illustration of an engine system of a vehicle.
Figure 2:
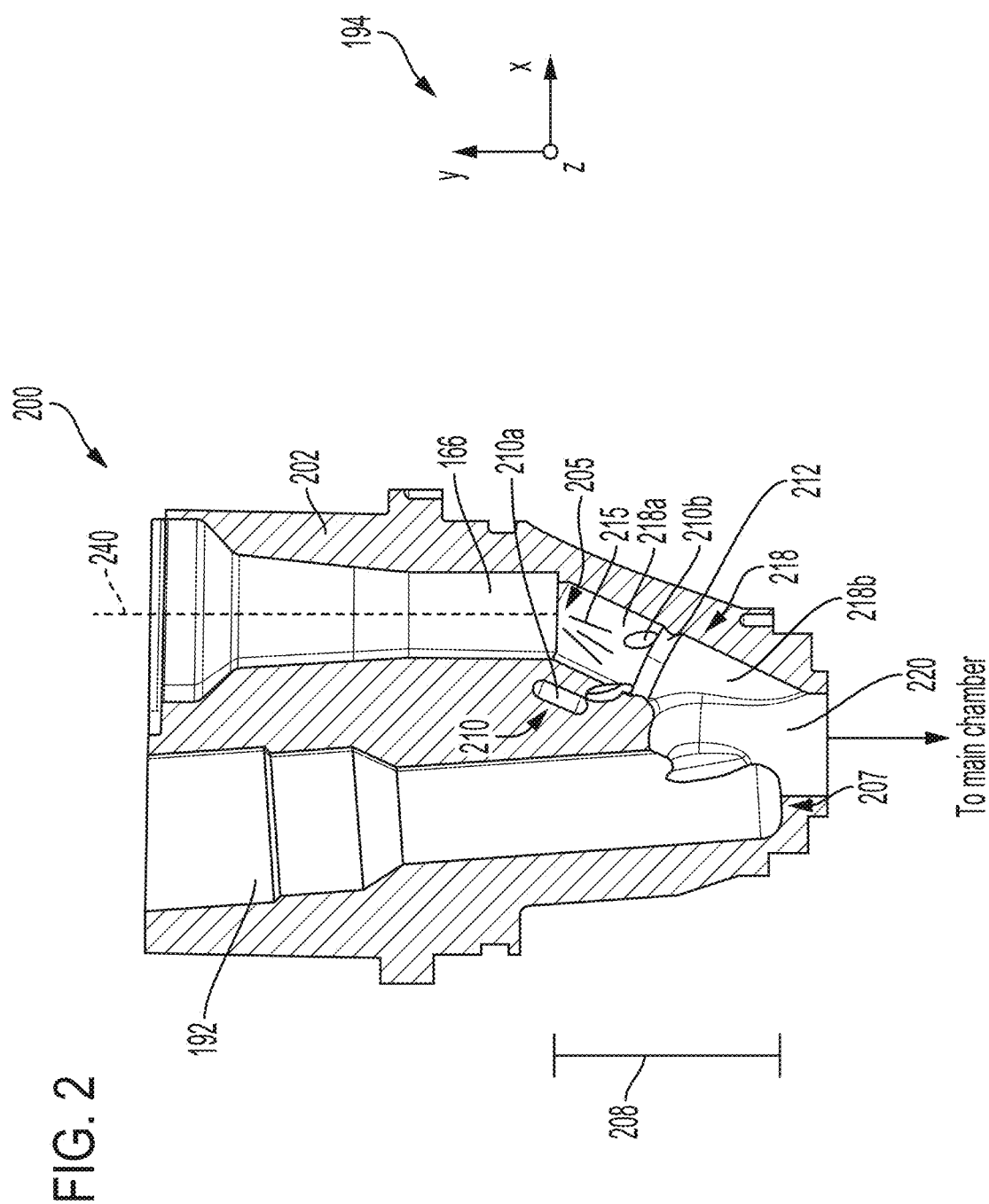
FIG. 2 depicts an example illustration of a pre-chamber housing of the present disclosure that includes a pre-chamber, a spark plug and a fuel injector.
Figure 3:
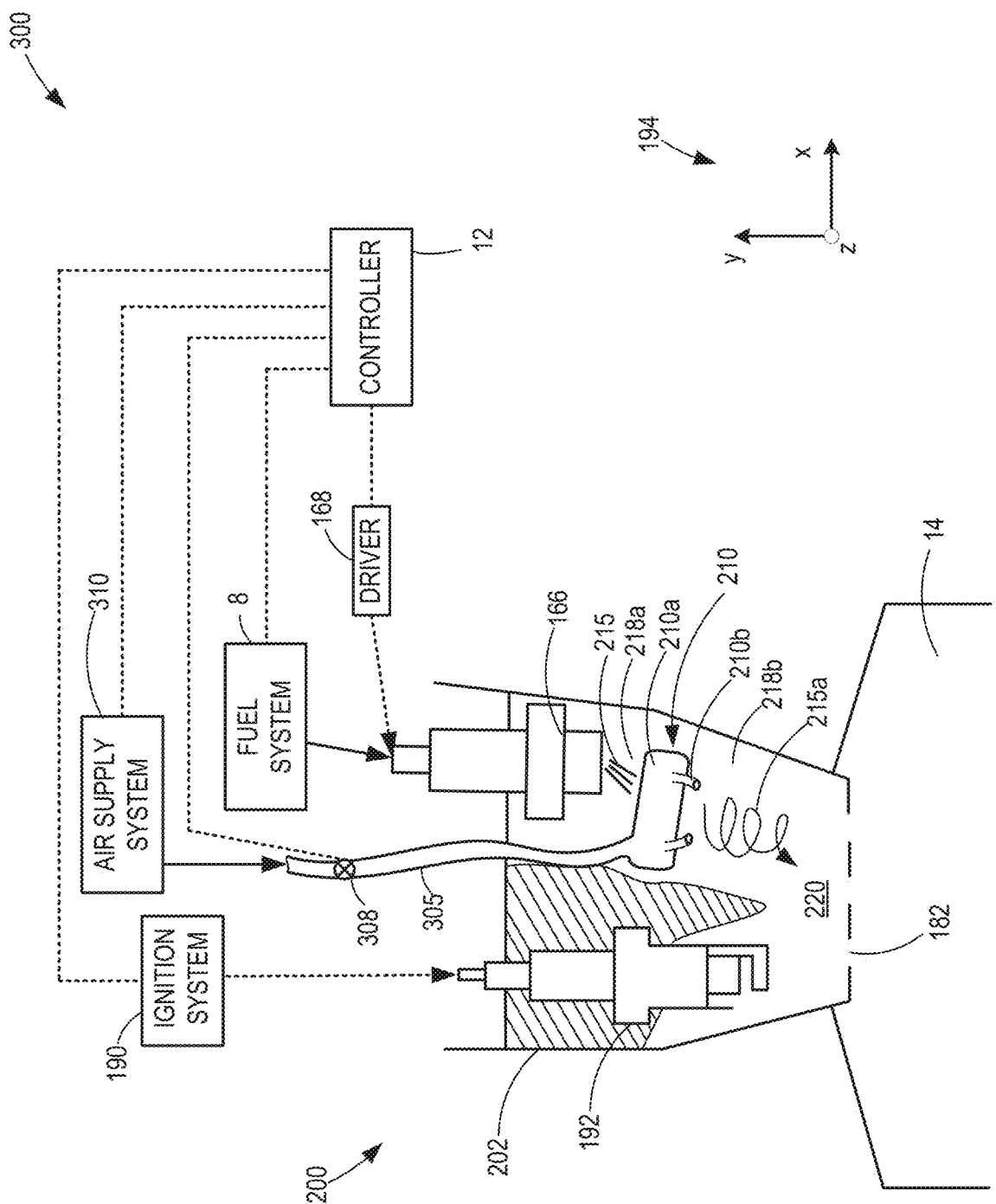
FIG. 3 schematically illustrates a pre-chamber housing of the present disclosure that includes a pre-chamber, a spark plug and a fuel injector, along with an air injector.
Figure 4B:
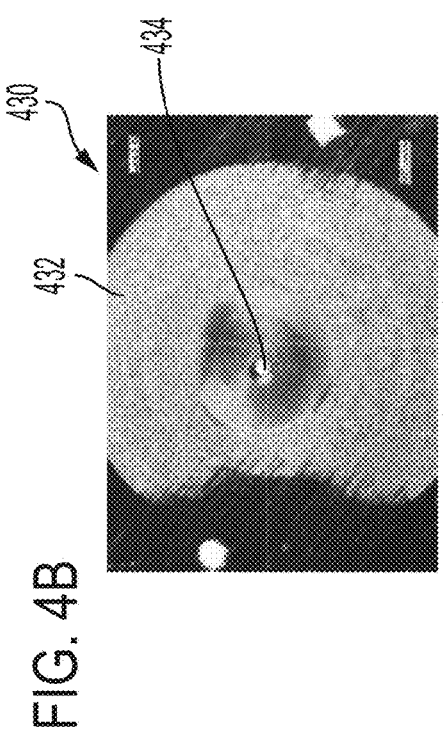
FIG. 4B depicts an example image of a spray hole for a pre-chamber fuel injector of the present disclosure.
Figure 4C:
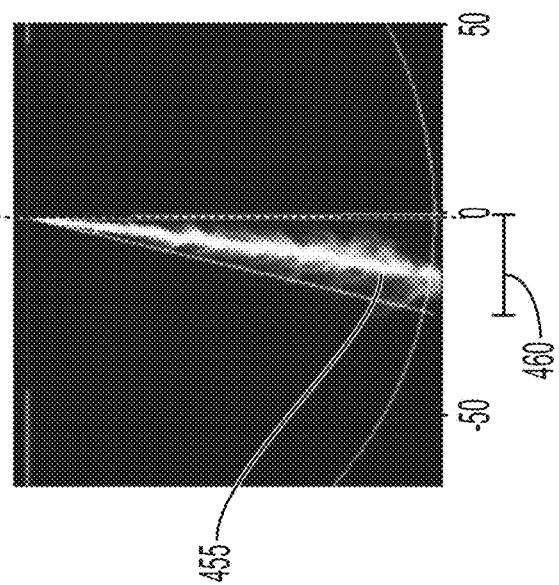
FIG. 4C depicts an actual image of a fuel spray from a pre-chamber fuel injector of the present disclosure.
Figure 4A:
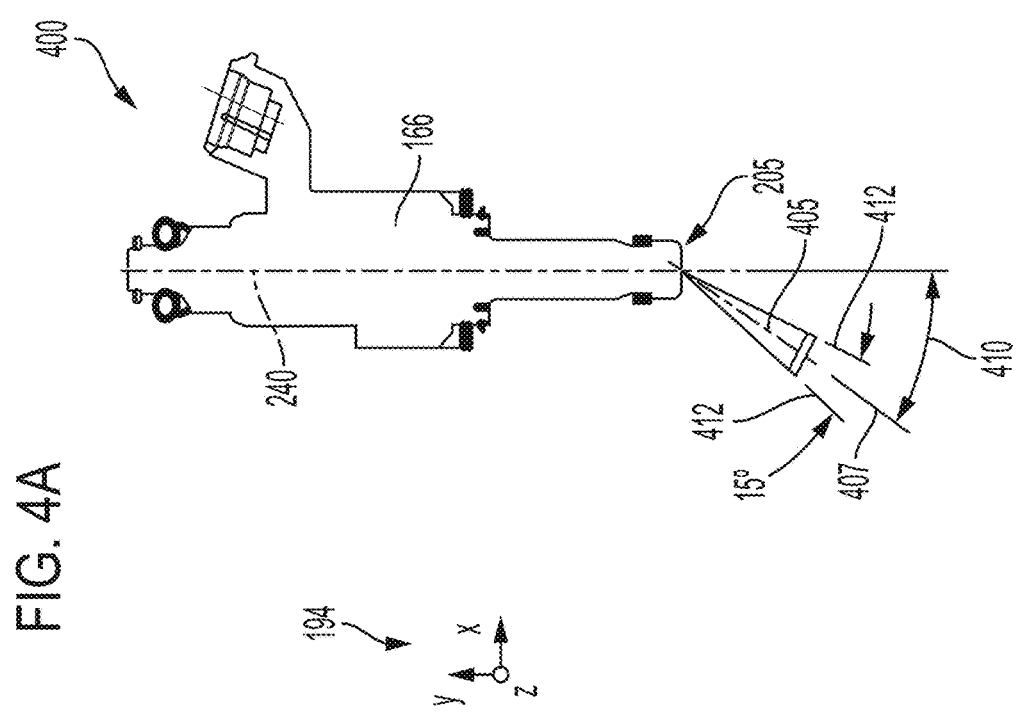
FIG. 4A shows an example angular range at which a fuel is sprayed from a pre-chamber fuel injector of the present disclosure.
Figure 6:
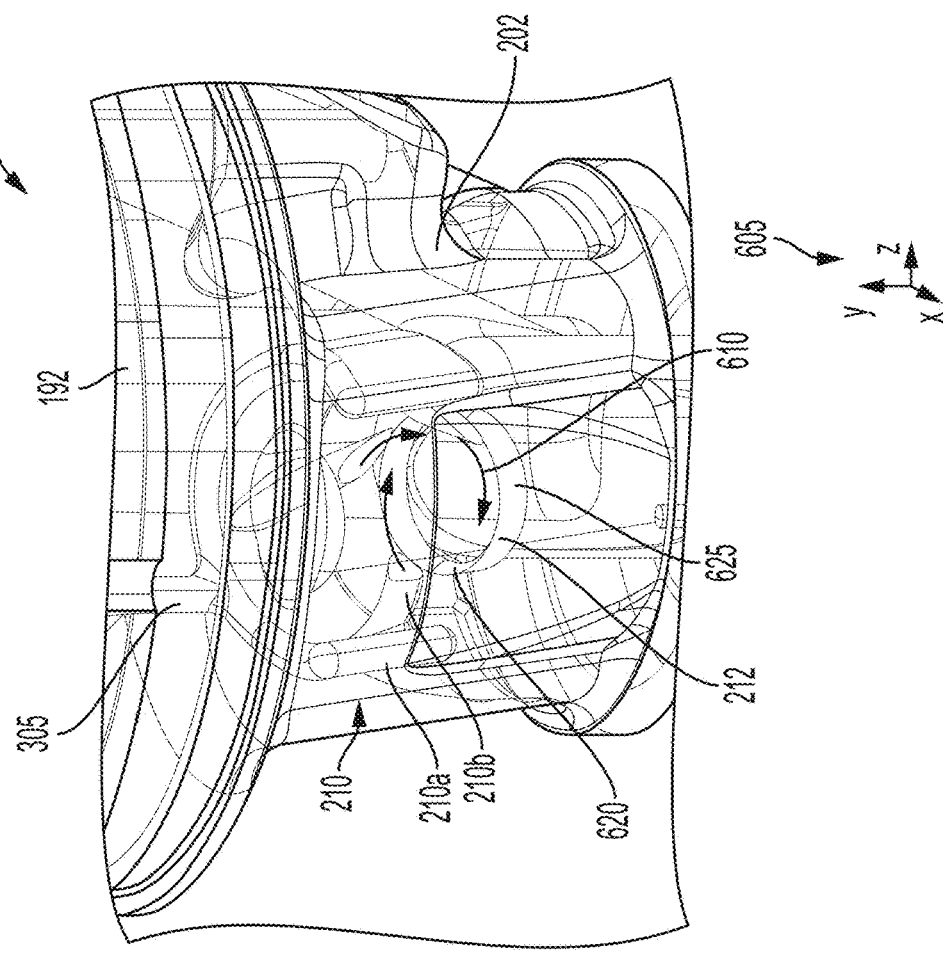
FIG. 6 depicts an example illustration of the air injector of the present disclosure, positioned within a pre-chamber housing of the present disclosure.
Figure 5:
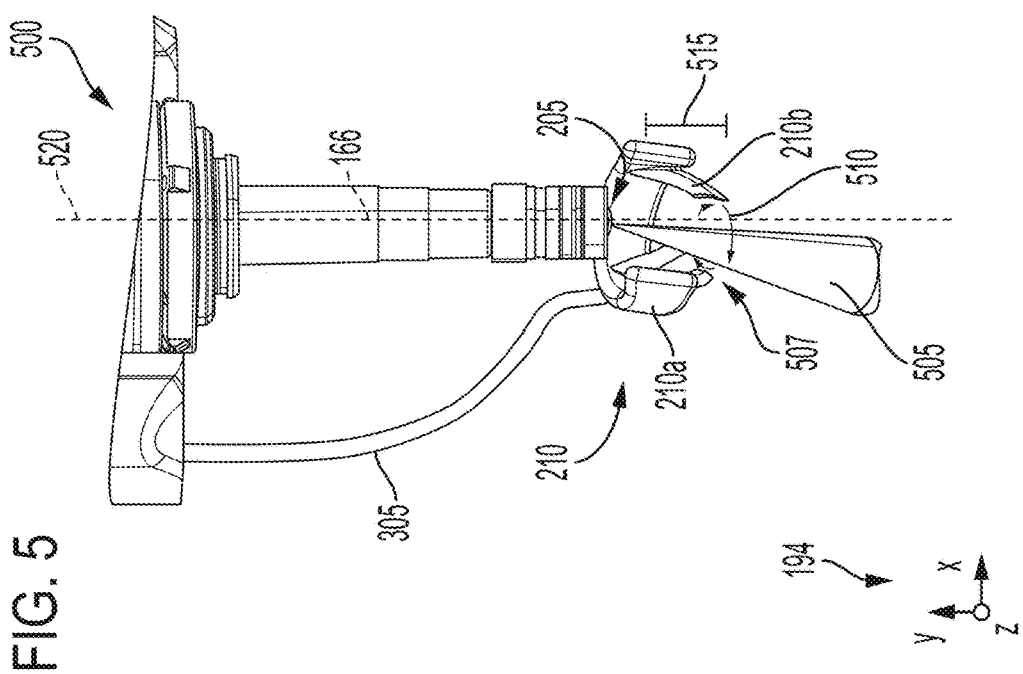
FIG. 5 depicts an example illustration of an isolated view of a pre-chamber fuel injector and an air injector of the present disclosure.
Figure 8:
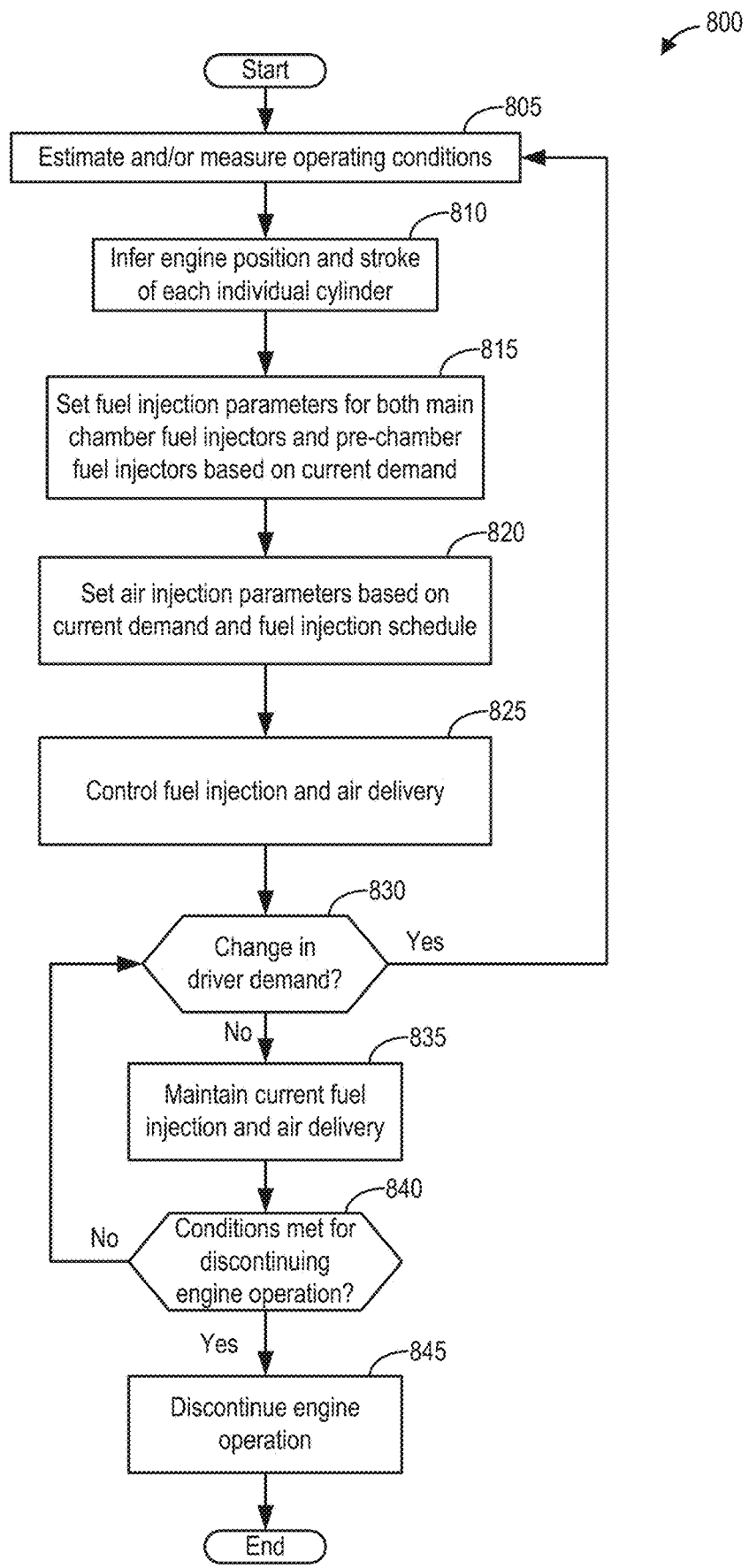
FIG. 8 depicts a high-level example method for controlling fuel and air injection parameters for an engine of the present disclosure.
Figure 9:
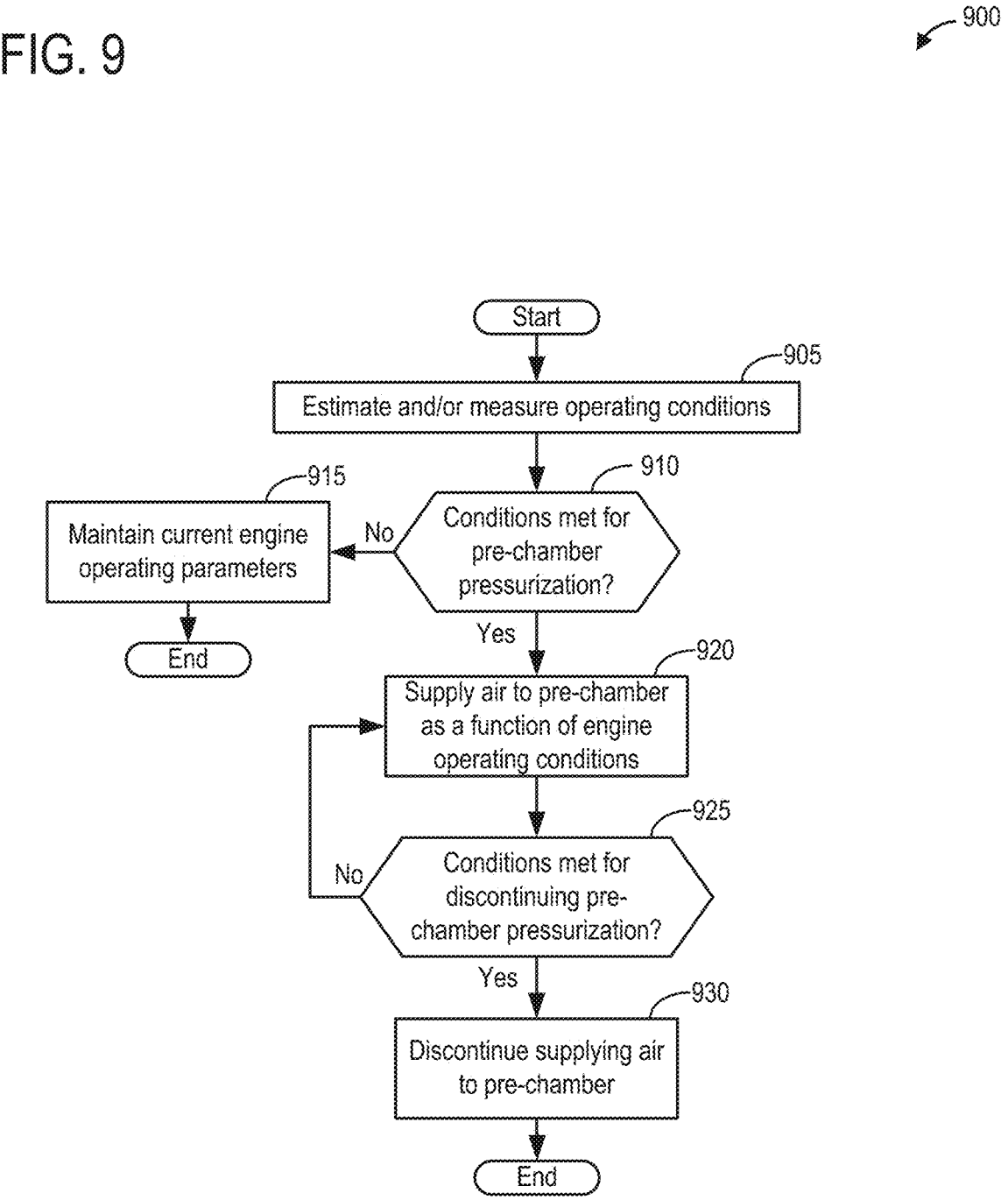
FIG. 9 depicts a high-level example method for controlling pre-chamber pressurization using an air injector of the present disclosure.

The following description relates to systems and methods for engine systems that include engine cylinders with a pre-chamber. Accordingly, depicted at FIG. 1 is an engine that includes an exemplary cylinder comprising a pre-chamber and a main chamber. To reduce wall wetting associated with pre-chamber fuel injection, and to improve pre-chamber air-fuel mixing, an air injection system may be included as part of the pre-chamber systems of the present disclosure, as depicted at FIGS. 2-3. Due to space constraints for pre-chamber systems of the present disclosure, which also include air injection systems, it may be desirable to impart an ability of the pre-chamber fuel injector to inject fuel within a predetermined angular range with respect to a central axis of the pre-chamber fuel injector. Imparting such ability may be realized via the use of additive manufacturing to produce fuel injectors with a spray hole(s) of a predetermined diameter. Accordingly, FIG. 4A schematically illustrates a pre-chamber fuel injector that sprays fuel at a desired angle with respect to the central axis of the pre-chamber fuel injector, FIG. 4B shows a tip of a pre-chamber fuel injector produced via additive manufacturing, with a spray hole of a predetermined diameter, and FIG. 4C shows an image of an actual spray pattern from an additively manufactured pre-chamber fuel injector of the present disclosure. The air injector may be positioned just below the pre-chamber fuel injector, with air injector orifices that extend in a downward and circumferential manner, so as to introduce a swirling or rotating pattern of air flow just beneath the pre-chamber fuel injector, as depicted at FIG. 5. The swirling or rotating pattern of air flow may be further encouraged by the inclusion of a venturi element comprising a ring-like structure positioned just below each of the air injector orifices, as illustrated at FIG. 6. FIG. 7 shows a view of a pre-chamber housing, to illustrate placement of an air injection line that supplies air to the air injector orifices. FIGS. 8-9 depict example methods for how to control air injection for the pre-chamber systems of the present disclosure, and FIG. 10 depicts a prophetic example timeline for controlling pre-chamber air injection according to the methods of FIGS. 8-9.

Turning now to FIG. 1, an example of a combustion chamber or cylinder of internal combustion engine 10 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. The cylinder 14 is capped by cylinder head 157. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 includes one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

In the example of FIG. 1, intake valve 150 and exhaust valve 156 are actuated (e.g., opened and closed) via respective cam actuation systems 153 and 154. Cam actuation systems 153 and 154 each include one or more cams mounted on one or more camshafts and may utilize one or more of cam profile switching (CPS), variable cam timing (VCT), variable valve timing (VVT) and/or variable valve lift (VVL) systems (for example continuously variable valve lift, or CVVL) that may be operated by controller 12 to vary valve operation.

The angular position of intake and exhaust camshafts may be determined by position sensors 173 and 175, respectively. In alternate embodiments, one or more additional intake valves and/or exhaust valves of cylinder 14 may be controlled via electric valve actuation. For example, cylinder 14 may include one or more additional intake valves controlled via electric valve actuation and one or more additional exhaust valves controlled via electric valve actuation.

Cylinder 14 can have a compression ratio, which is the ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 housed within cylinder head 157 for initiating combustion. Ignition system 190 can provide an ignition spark via spark plug 192 in response to spark advance signal SA from controller 12, under select operating modes. Spark plug 192 is depicted at FIG. 1 as positioned within pre-chamber 181, and further aspects of pre-chamber 181 will be elaborated in greater detail below. As discussed herein, combustion chamber 14 may also be referred to as main chamber 14.

In some examples, each cylinder of engine 10 may be configured with one or more fuel injectors for providing fuel thereto. As a non-limiting example, depicted are two fuel injectors 166 and 170. Fuel injectors 166 and 170 may be configured to deliver fuel received from fuel system 8 which may include one or more fuel tanks, fuel pumps, and fuel rails. Fuel injector 166 is illustrated as providing fuel to pre-chamber 181. Specifically, fuel injector 166 may comprise a direct injector (DI) which can provide an amount of auxiliary fuel (e.g., 5% or less of a total system fuel) to pre-chamber 181. Discussed herein, fuel injector 166 may be referred to as pre-chamber fuel injector 166. Pre-chamber 181 is connected to main chamber 14 by one or more pre-chamber orifices 182, which may enable jets of partially combusted products to ignite the main charge. The orifices may cause turbulence in hot gas jets introduced to the main chamber 14, which may then penetrate deeper into the main combustion chamber to enable an evenly distributed ignition effect. Pre-chamber fuel injector 166 may inject fuel, received from fuel system 8, in proportion to the pulse width of signal FPW-1 received from controller 12 via electronic driver 168. The main chamber 14 may be fueled through another fuel injector, depicted here as fuel injector 170. Accordingly, discussed herein, fuel injector 170 may be referred to as main chamber fuel injector 170. Main chamber fuel injector 170 is shown arranged in intake passage 146, rather than as part of cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted. While fuel injector 170 is depicted as providing port injection to main chamber 14, in other examples it may be understood that fuel injector 170 may be configured as a direct fuel injector, for injecting fuel directly into main chamber 14 (and not into pre-chamber 181).

It may be understood that via the use of the pre-chamber 181, the main charge may be extensively ignited and a faster burn-through and pressure build-up may be generated. Furthermore, this process may allow increased compression ratios, combined with lower combustion temperatures and reduced throttling/pumping losses to achieve peak thermal efficiencies.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel (or directed injected in the case of a direct fuel injector) may be delivered during an open intake valve event, closed intake valve event (e.g., substantially before the intake stroke), as well as during both open and closed intake valve operation. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics, such as differences in size. For example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

While not explicitly illustrated at FIG. 1, an air injector (and air injector system) may be included in engine 10, and may enable air to be injected to pre-chamber 181. As will be elaborated in greater detail below, the air injector may be used to provide a curtain of air around the fuel sprayed by pre-chamber fuel injector 166. The curtain of air around the fuel spray may serve to minimize wall wetting, optimize pre-chamber mixing of air and fuel, and optimize charge delivery into the main chamber, as will be elaborated in greater detail below.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches are engaged. In the depicted example, a first clutch 56 is provided between crankshaft 140 and electric machine 52, and a second clutch 97 is provided between electric machine 52 and transmission 54. Controller 12 may send a signal to an actuator of each clutch (e.g., first clutch 56 and/or second clutch 97) to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, FIG. 1 shows only one cylinder of multi-cylinder engine 10. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

For discussion with regards to remaining figures, inset 194 depicts an x, y and z axis system with respect to engine 10. It may be understood that the x, y and z axis system as shown is with respect to engine 10, and not necessarily to the fuel system, ignition system, battery, motor/generator, transmission, wheels, etc., also depicted at FIG. 1. Specifically, it may be understood that piston 138 may undergo translational motion along the y-axis. Intake valve 150 and exhaust valve 156 are offset along the y-axis, and engine 10 as depicted is viewed at FIG. 1 along the z-axis. Components such as the battery, motor/generator, transmission and wheels are shown illustratively and it may be understood that the x, y and z axis is not meant to refer to such components.

Turning now to FIG. 2, an example pre-chamber system 200 depicts a view of a pre-chamber housing that includes a spark plug, pre-chamber fuel injector and air injector of the present disclosure. It may be understood that the view of illustration 200 depicts the pre-chamber housing and associated components sliced along the x-y plane. Inset 194 depicts the same x, y and z axis system as that depicted at FIG. 1 for reference.

As shown at FIG. 2, pre-chamber system 200 includes pre-chamber housing 202. Included within pre-chamber housing is spark plug 192, and pre-chamber fuel injector 166. A fuel injector tip 205 is depicted as offset along the y-axis from spark plug tip 207. Specifically, fuel injector tip 205 is offset from spark plug tip 207 by a predetermined length 208. It may be understood that predetermined length 208 is exemplary in nature. For example, it is within the scope of this disclosure for predetermined length 208 to be zero (e.g., mm) or within a positive non-zero threshold of zero (e.g., mm). It may be understood that predetermined length 208 may be a function of space constraints associated with the engine (e.g., engine 10), which in turn may dictate design of pre-chamber housing 202. Furthermore, as mentioned above and which will be further elaborated below, pre-chamber system 200 includes air injector 210. Air injector 210 is not depicted in great detail at FIG. 2, as the illustration as mentioned is a cross-sectional view. Higher level details regarding air injector 210 are depicted at FIG. 3 and FIGS. 5-7.

Briefly, it may be understood that air injector 210 may include an air injector scaffold section 210a, from which may extend air injector orifices 210b. Depicted at FIG. 2 are two such air injector orifices, but it may be understood as will be shown in greater detail below, that more than two such air injector orifices (e.g., 3, 4, more than 4, etc.) may extend from air injector scaffold section 210a. For example, it may be understood that the air injector 210 at FIG. 2 may include three air injector orifices, but just two are viewable due to the cross-sectional nature of FIG. 2 rendering one air injector orifice unable to be viewed. The air injector orifices 210b are depicted as being positioned just above venturi element 212. As will be discussed in greater detail below, venturi element 212 may have a ring-like structure, and may serve to further influence or direct the manner in which air flow from the air injector orifices travel. For example, air injector orifices 210b may be arranged around a circumference of venturi element 212. Due to such an arrangement, air flowing from the air injector orifices 210b may be induced to flow in a swirling or rotating pattern of flow. The air flow may be further induced to exhibit the swirling or rotating pattern of flow by the venturi element 212. For example, as air flowing from the air injector orifices impacts an inner area of the venturi element, the air may be further encouraged to flow in an approximately circular or swirling pattern of flow.

Thus, it may be understood that fuel 215 (depicted illustratively as three lines) may exit fuel injector tip 205 and may travel within pre-chamber fuel port 218. Pre-chamber fuel port 218 may be positioned at an angle with respect to a center axis 240 of pre-chamber fuel injector 166. Pre-chamber fuel port 218 being at an angle with respect to the center axis 240 of pre-chamber fuel injector 166 may be due to space considerations. For example, in order to accommodate spark plug 192, pre-chamber fuel injector 166, and air injector 210, housing 202 may be such that in order for fuel to be delivered to pre-chamber 220, pre-chamber fuel port 218 leading to pre-chamber 220 may have to be positioned at an angle with respect to a center axis 240 of pre-chamber fuel injector 166. However, it may be understood that other designs are within the scope of this disclosure. For example, pre-chamber fuel port 218 may be positioned along a similar axis as that of the center axis 240 of pre-chamber fuel injector 166, without departing from the scope of this disclosure.

Pre-chamber fuel port 218 may comprise an upper pre-chamber fuel port 218a and a lower pre-chamber fuel port 218b. Upper pre-chamber fuel port 218a may be between venturi element 212 and fuel injector tip 205. Lower pre-chamber fuel port 218b may be between venturi element 212 and pre-chamber 220 (e.g., same as pre-chamber 181 at FIG. 1). As will be discussed in greater detail below, fuel may exit pre-chamber fuel injector tip 205 at an angle so as to travel through pre-chamber fuel port 218. Fuel exiting pre-chamber fuel injector tip 205 may interact with the air flowing from air injector orifices 210b, and the mixture of air and fuel may continue to travel through lower pre-chamber fuel port 218b. The mixture of air and fuel may be directed to pre-chamber 220, where spark from spark plug 192 may ignite the air-fuel mixture. The ignited air-fuel mixture may then travel to the main chamber (e.g., main chamber 14 at FIG. 1), where fuel present in the main chamber may thus be ignited.

Turning now to FIG. 3, depicted is an example illustration 300 that shows pre-chamber system 200 with additional details for illustrative purposes. Components that are the same as that discussed with regard to FIG. 1 and FIG. 2 are depicted by common numerals. Thus, briefly, pre-chamber system 200 includes pre-chamber housing 202, which houses spark plug 192 and pre-chamber fuel injector 166. While not shown in great detail, pre-chamber system 200 includes upper pre-chamber fuel port 218a, and lower pre-chamber fuel port 218b. As discussed above, fuel injector 166 may inject fuel into upper pre-chamber fuel port 218a, and the fuel may mix with air exiting one or more air injector orifices 210b. The air-fuel mixture may then travel through lower pre-chamber port 218b before being ignited by spark plug 192 in pre-chamber 220. The ignited air-fuel mixture may be communicated to main chamber 14 via one or more pre-chamber orifices 182. As an example, the pre-chamber orifices may in some examples be included as part of a nozzle (not shown) designed to spray the ignited air-fuel mixture in a predetermined flow pattern.

Air injector scaffold 210a, and in turn air injector orifices 210b, may receive high pressure air via air injector line 305. Air injector line 305 may include air injector control valve 308. Air injector control valve 308 may be, for example, a solenoid-actuated control valve, under control of controller 12. Thus, high pressure air may be supplied to air injector 210 by way of air injector line 305 from air supply system 310. By controlling a duty cycle of air injector control valve 308, an amount of air flow supplied to air injector 210 may be regulated under control of the controller 12. For example, a fully closed air injector control valve may prevent any air from being supplied to pre-chamber 220, which may be advantageous under conditions where parameters such as fuel economy and/or emissions, etc., may not benefit from air provided via air injector 210. In other examples, an amount and/or pressure of air supplied to pre-chamber 220 may be varied, under control of controller 12, for example by controlling the duty cycle of the air injector control valve 308.

As depicted at FIG. 3, fuel 215 exiting pre-chamber fuel injector 166, encounters air (not shown) flowing from air injector orifices 210b, thus resulting in a swirling mixture of air and fuel, represented as a swirling line 215a. It may be understood that the swirling pattern of air-fuel mixture may serve to reduce wall wetting (e.g., walls of lower pre-chamber port 218b and/or walls defining pre-chamber 220), optimize air/fuel mixing, and may further serve to optimize charge delivery into main chamber 14 below.

While discussion with regard to FIG. 2 and FIG. 3 include an upper pre-chamber port between pre-chamber fuel injector 166 and air injector 210, it may be understood that in some examples there may be little to no separation between the tip of pre-chamber fuel injector 166 and air injector 210. For example, minimizing a separation between the tip (e.g., fuel injector tip 205 at FIG. 2) of fuel injector 166 and air injector 210 may serve to minimize spreading of the fuel mist that exits fuel injector 166 prior to being induced into the swirling pattern of flow via the air exiting the air injector orifices 210b.

Turning now to FIG. 4A, depicted is an isolated view 400 of pre-chamber fuel injector 166. Depicted is central axis 240 of pre-chamber fuel injector 166. As discussed above with regard to FIG. 2 and FIG. 3, due to space constraints the pre-chamber fuel port (e.g., pre-chamber fuel port 218 at FIG. 2) may be angled with respect to the central axis 240 of pre-chamber fuel injector 166. Accordingly, fuel exiting pre-chamber fuel injector 166 may have to exit at an angle in order to direct the fuel plume through the pre-chamber fuel port. It may be desirable to control spreading of the fuel plume exiting the pre-chamber fuel injector, to a predetermined level. As an example, FIG. 4A depicts fuel plume 405. Further depicted is a fuel plume central axis 407. Line 410 represents a predetermined number of degrees (e.g., 30°) from central axis 240 of pre-chamber fuel injector 166 to the fuel plume central axis 407. Still further depicted are lines 412, defining an outer boundary of fuel plume 405 that expands with distance from fuel injector tip 205. It may be desirable, for example, to be able to control the predetermined number of degrees (refer to line 410) that the fuel plume central axis 407 is offset from the central axis 240 of fuel injector 166. It may be further desirable to control the amount of degrees that define the outer boundary (with respect to fuel plume central axis 407) to within a predetermined threshold number of degrees (refer to lines 412) at a predetermined distance from fuel injector tip 205.

In order to do so, it is herein recognized that a single hole fuel injector nozzle may be used for pre-chamber fuel injectors of the present disclosure. Furthermore, the fuel injector tip may be of a particular diameter (e.g., less than 6 mm, 6 mm, 7 mm, etc.) to minimize packaging space. It is herein recognized that additive manufacturing may be used to manufacture such a single hole fuel injector nozzle for improved fuel metering and accuracy. Turning to FIG. 4B, depicted is an illustration 430 of a portion of a fuel injector tip 432 (e.g., same as pre-chamber fuel injector tip 205 at FIG. 2) that includes a single hole 434, where fuel injector tip 432 is made via additive manufacturing, also referred to herein as 3D printing. The single hole 434 may be of a diameter of, for example, 60 microns with a tolerance of 2 microns. However, other similarly sized single holes for the pre-chamber fuel injector tip are within the scope of this disclosure. For example, the single hole may be somewhere between 40-80 microns. The tolerance may be from 1-5 microns, for example. In this way, precise spray targeting and fuel plume angle may be enabled, such that the pre-chamber fuel injector may be used in a pre-chamber system such as that depicted at FIG. 2, for example.

Turning now to FIG. 4C, depicted is an example image 450 of a fuel plume 455 exiting a single hole pre-chamber fuel injector. Depicted is a central axis 457 that corresponds to a central axis of the single hole pre-chamber fuel injector (not shown at FIG. 4C), similar to central axis 240 at FIG. 4A. Line 460 represents a threshold angle that fuel plume 455 is maintained within with respect to the central axis 457 of the single hole pre-chamber fuel injector.

Turning now to FIG. 5, depicted is an example illustration 500 showing pre-chamber fuel injector 166, air injector 210, and air injector line 305. As depicted fuel injector tip 205 is just above air injector scaffold 210a along the y-axis (refer to inset 194), such that fuel plume 505 travels through an area 507 bounded by air injector scaffold 210a and air injector orifices 210b en route to the pre-chamber (e.g., pre-chamber 220 at FIG. 2). Arrows 510 illustratively depict a general direction of flow from each of the three air injector orifices 210b. The general direction of air flow from each of the air injector orifices 210b produces an overall circular pattern of air flow that serves to create a curtain of air around the actual fuel spray, thereby restricting the expansion of the fuel spray to within predefined limits. It may be understood that this curtain of air may serve to minimize wetting of walls associated with the pre-chamber fuel port (e.g., pre-chamber fuel port 218 at FIG. 2) and pre-chamber (e.g., pre-chamber 220 at FIG. 2).

As depicted at FIG. 5, each air injector orifice 210b comprises a tube-like structure that extends from air injector scaffold 210a in a generally downward direction along the y-axis and also in a generally circumferential direction with respect to the air injector scaffold, such that air exiting each of the air injector orifices 210b forms the approximately circular air flow as depicted by arrows 510. Line 515 represents a distance by which air injector orifices 210b extend downward along the y-axis from the air injection scaffold 210a, and it may be understood that such a distance, along with an overall curvature of the tube-like structure comprising each of the air injector orifices, are shown as representative examples but modifications to the dimensions as illustrated are within the scope of this disclosure. Not shown at FIG. 5 is the venturi element (e.g., venturi element 212 at FIG. 2), which as discussed may serve to further refine the overall pattern of air flow created by air exiting each of the air injector orifices 210b.

Fuel plume 505 is depicted at FIG. 5 as exiting pre-chamber fuel injector tip 205 at an angle with respect to a central axis 520 of pre-chamber fuel injector 166, similar to that discussed above. Accordingly, in such an example it may be understood that air injector 210 may be positioned in a manner such that fuel plume 505 travels through the central area (e.g., area 507) defined by air injector scaffold 210a and air injector orifices 210b. It may be understood that the placement of air injector 210 may be adjusted depending on the angle at which fuel is sprayed from the pre-chamber fuel injector 166.

Air injector scaffold 210a is depicted at FIG. 5 as being semi-circular in nature. Such a design may be selected due to space constraints, for example. However, it is also within the scope of this disclosure for air injector scaffold 210a to comprise an entirely circular scaffold, which may in some examples enable the inclusion of more than three air injector orifices (e.g., four, or greater than four).

Turning now to FIG. 6, depicted is an example illustration 600 of a close-up view of the air injector 210 including air injector scaffold 210a, air injector orifices 210b, a portion of air injector line 305, and venturi element 212, viewed along the x axis (refer to inset 605). Pre-chamber housing 202 is depicted as transparent, in order to enable a view of the relative positioning of each of the air injector scaffold 210, air injector orifices 210b, venturi element 212, air injector line 305, and spark plug 192 in relation to one another. Not shown at FIG. 6 is the pre-chamber fuel injector (e.g. pre-chamber fuel injector 166 at FIG. 2), for clarity. Arrows 610 depict a general direction of air flow exiting each of the air injector orifices, in order to create the overall approximately circular pattern of air flow as discussed. Venturi element 212 is positioned directly below the air injector orifices, with respect to the y-axis. Venturi element 212 may be positioned such that air exiting each of the air injector orifices contacts the venturi element, and the interaction between the air flow and the venturi element may further serve to encourage the generally circular nature of the overall air flow. Thus, as depicted venturi element 212 is a ring-like structure, with a predetermined diameter and predetermined height that may be selected based on design considerations. In some examples, an inner surface 620 of venturi element 212 may be convex as depicted (where air flow contacts the venturi element) while an outer surface 625 may be concave. However, in other examples the inner surface may not be convex, and instead may be straight. It may be understood that other design variations of the venturi element are within the scope of this disclosure, for encouraging a desired patterning of overall air flow upon air exiting each of the air injector orifices 210b.

Turning now to FIG. 7, depicted is another example illustration 700, showing another view of pre-chamber housing 202 as transparent in order to reveal a positioning of air injector line 305 within pre-chamber housing 202. Inset 705 depicts x, y and z axes. Spark plug 192 is included in illustration 700, whereas pre-chamber fuel injector 166 is not shown, however fuel injector slot 710 is depicted as transparent, and thus it may be understood that the pre-chamber fuel injector 166 may be inserted into fuel injector slot 710. As shown, air injector line 305 extends from air injector scaffold 210a along the y-axis, and as discussed with regard to FIG. 3, may receive high pressure air supply from air supply system 310 (not shown at FIG. 7). Air injector line 305 is, in this example configuration, positioned between the fuel injector and the spark plug, however it may be understood that other placement locations are within the scope of this disclosure. Importantly, air injector line 305 is integrated into the pre-chamber housing 202.

There may be a number of ways in which air injection may be controlled during engine operation, when using the pre-chamber system of the present disclosure. Accordingly, turning to FIG. 8, depicted is a high-level example method 800 for controlling air injection and fuel injection parameters based on driver demand and engine operating conditions. Method 800 will be described with reference to the systems described herein and shown in FIGS. 1-7, though it should be understood that similar methods may be applied to other systems without departing from the scope of this disclosure. Method 800 may be carried out by a controller, such as controller 12 in FIG. 1, and may be stored at the controller as executable instructions in non-transitory memory. Instructions for carrying out method 800 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such pre-chamber fuel injector (e.g., pre-chamber fuel injector 166 at FIG. 1), main chamber fuel injector (e.g., main chamber fuel injector 170 at FIG. 1), spark plug (e.g., spark plug 192 at FIG. 1), air supply system (e.g., air supply system 310 at FIG. 3), air injector control valve (e.g., air injector control valve 308 at FIG. 3), etc., to alter states of devices in the physical world according to the method below.

Method 800 begins at 805, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 810, method 800 includes inferring engine position and stroke of each engine cylinder. Such information may be inferred based on output from one or more of a crankshaft position sensor (e.g., hall effect sensor 120 at FIG. 1), fuel injection schedule, spark timing, etc. Proceeding to 815, method 800 includes setting fuel injection parameters for both main chamber fuel injection as well as pre-chamber fuel injection, based on current driver demand. For example, based on current driver demand, a timing and duration of fuel injection corresponding to both the main chamber fuel injector and the pre-chamber fuel injector may be determined, and set accordingly via the controller. For example, there may be circumstances where no pre-chamber fuel injection is requested but where main chamber fuel injection is used, whereas in other instances it may be desirable to rely on pre-chamber fuel injection in addition to main chamber injection. It may be understood that main chamber injection may occur during an intake stroke of a particular engine cylinder, whereas pre-chamber injection may occur during some point of a compression stroke of the particular cylinder, for a four stroke engine that operates via intake, compression, power and exhaust strokes.

Proceeding to 820, method 800 includes setting air injection parameters based on the current driver demand and fuel injection schedule. Specifically, method 800 includes determining how to control the air supply system (e.g., air supply system 310 at FIG. 3) and air injector control valve (e.g., air injector control valve 308 at FIG. 3) in a manner consistent with optimal pre-chamber system and main chamber operation given current engine operating conditions and driver demand. As one example, setting air injection parameters may include setting a duty cycle for the air injector control valve, in order to supply a predetermined amount of high pressure air flow via the air injector. In some examples, the controller may determine that conditions are such that the engine may be effectively operated in terms of fuel economy and emissions, without any injection of air to the pre-chamber system. In such examples, the controller may command the air injector control valve fully closed. To set an appropriate duty cycle, the controller may rely on one or more lookup tables that enable the controller to infer the appropriate duty cycle based on one or more parameters related to driver demand and current engine operating conditions.

With the fuel injection and air injection schedules set, method 800 proceeds to 825. At 825, method 800 includes controlling fuel injection and air injection according to the schedules set at steps 815 and 820 of method 800. For example, the controller may send a signal to a solenoid actuator associated with the main chamber fuel injector, to control the manner in which fuel is supplied to the main chamber via the main chamber fuel injector. The controller may in some examples additionally send another signal to another solenoid actuator associated with the pre-chamber fuel injector, to control the manner in which fuel is supplied to the pre-chamber via the pre-chamber fuel injector. The controller may in some examples send a signal to yet another solenoid actuator associated with the air injector control valve, to control a manner in which air is supplied to the pre-chamber system.

Continuing to 830, method 800 includes judging whether there is a change in driver demand such that current operating parameters with regard to at least fuel injection and air injection are no longer valid and have to be updated. If so, then method 800 returns to 810 where steps 810-825 are repeated to obtain new fuel injection and air injection parameters. Alternatively, if a change in driver demand is not indicated, method 800 proceeds to 835. At 835, method 800 includes maintaining current fuel injection and air injection parameters. Method 800 then proceeds to 840, and includes judging whether conditions are met for discontinuing engine operation. Conditions may be met for discontinuing engine operation in response to a driver of the vehicle deactivating the vehicle (e.g., a key-off event or other means where by the vehicle is requested to be turned off). In another example, conditions may be met for discontinuing engine operation responsive to the controller commanding a transition from an engine operating mode to an electric-only mode of operation. In yet another example where the vehicle includes start/stop capability where the engine may be shut down when the vehicle comes to a stop (or when driver demand torque and/or vehicle speed is below predetermined thresholds), conditions may be met for discontinuing engine operation responsive to the vehicle coming to a stop or when driver demand torque and/or vehicle speed are below the predetermined thresholds.

If conditions are indicated to be met for discontinuing engine operation, method 800 proceeds to 845 where engine operation is discontinued, and the engine may spin to rest. Method 800 may then end.

Alternatively, at 840, responsive to conditions not being indicated to be met for discontinuing engine operation, method 800 returns to 830. At 830, method 800 includes continuing to judge whether there is a change in driver demand, and if so, method 800 returns to 810 in similar fashion as discussed above.

Turning now to FIG. 9, depicted is another example method 900, for controlling a pre-chamber system pressure by using the air injector (e.g., air injector 210 at FIG. 3) to inject a determined amount of air for a determined time frame. Specifically, it is herein recognized that engine operation may result in residuals being pushed back (e.g., during compression strokes and/or exhaust strokes) into the pre-chamber systems of the present disclosure, which may negatively impact operation of such pre-chamber systems. For example, residuals may interact with one or more components of the pre-chamber system, including but not limited to the pre-chamber fuel injector, the air injector, etc., which may result in at least partial clogging and thereby degraded pre-chamber system operation. Accordingly, it is herein recognized that it may be desirable to control air injection to the pre-chamber system in a manner that reduces opportunity for residuals to be pushed back into the pre-chamber system. It may be understood that method 900 may apply to each individual cylinder that includes a pre-chamber system of the present disclosure.

Method 900 will be described with reference to the systems described herein and shown in FIGS. 1-7, though it should be understood that similar methods may be applied to other systems without departing from the scope of this disclosure. Method 900 may be carried out by a controller, such as controller 12 in FIG. 1, and may be stored at the controller as executable instructions in non-transitory memory. Instructions for carrying out method 900 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such pre-chamber fuel injector (e.g., pre-chamber fuel injector 166 at FIG. 1), main chamber fuel injector (e.g., main chamber fuel injector 170 at FIG. 1), spark plug (e.g., spark plug 192 at FIG. 1), air supply system (e.g., air supply system 310 at FIG. 3), air injector control valve (e.g., air injector control valve 308 at FIG. 3), etc., to alter states of devices in the physical world according to the method below.

Method 900 begins at 905, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 910, method 900 includes indicating whether conditions are met for pre-chamber pressurization. For example, conditions being met for pre-chamber pressurization may be different than conditions for air injection associated with the use of air injection for fuel combustion events as discussed with regard to method 800. In other words, pre-chamber pressurization via use of the air injector may be with regard to timeframes when the air injection is not being used to create a curtain of air around fuel injected by the pre-chamber fuel injector, but rather when it is simply desired to pressurize the pre-chamber system in a manner that reduces an amount of residuals that may otherwise be introduced to the pre-chamber system.

However, it may be understood that in some examples pressurization and the use of the air injector to produce a curtain of air for fuel injected from the pre-chamber fuel injector may not be mutually exclusive. For example, in the case of a compression stroke, the air injector may be relied upon to pressurize the pre-chamber system while the piston is traveling from BDC to TDC, which may reduce an amount of residual fuel that may be pushed to the pre-chamber system. Furthermore, the air injector may also be used to provide the cushion of air around fuel injected via the pre-chamber fuel injector around a time when the piston is reaching TDC. However, in other examples it may be desirable to pressurize the pre-chamber system via the use of air injection at times other than during the compression stroke.

As one example, conditions being met at 910 may include a cylinder deactivation condition. For example, for an engine that is capable of cylinder deactivation (e.g., variable displacement engine) where intake and exhaust valves may be maintained closed such that the cylinder is operated as an air spring, it may be desirable to control an amount of air injected to the pre-chamber system to reduce an amount of any residuals from being pushed to the pre-chamber system. It may be understood that in such an example, because the cylinder is sealed, the amount of air injection may have to be closely controlled so as to avoid over pressurizing the sealed cylinder. The controller may control the amount of air supplied to the pre-chamber system via controlling a duty cycle of the air injector control valve (e.g., air injector control vale 308 at FIG. 9), for example.

As another example, conditions being met at 910 may include a deceleration fuel shut off (DFSO) event, where driver demand is such that fuel injection to one or more engine cylinders may be discontinued. In such an example, intake and exhaust valves may continue to operate in some examples, and it may be advantageous to command the air injector to supply a predetermined amount of air to the pre-chamber system in order to reduce the amount of residuals/particulate which may otherwise be pushed to the pre-chamber system.

With regard to the above examples, in some examples, air injection may be supplied to the pre-chamber system just when the piston is traveling from BDC to TDC, and not when the piston is traveling from TDC to BDC. For example, when the piston is traveling from TDC to BDC, a vacuum may be created in the pre-chamber system that may serve to pull any residuals/particulate from the pre-chamber system to the main chamber, and from there, eventually to the exhaust passage. Thus, it may be possible to avoid injecting air to the pre-chamber system when the piston is traveling from TDC to BDC, but it may be understood that it may in some examples be advantageous to also inject air to the pre-chamber system while the piston is traveling from TDC to BDC.

In some examples, conditions being met at 910 may include an indication that a battery state of charge (SOC) is greater than a predetermined threshold SOC, an indication that a temperature of the engine is within a predetermined threshold engine temperature range, etc.

If, at 910, it is indicated that conditions are not met for pre-chamber pressurization, method 900 proceeds to 915. At 915, method 900 includes maintaining current engine operating parameters. For example, the air injector may not be relied upon specifically for pressurizing the pre-chamber system, but may still be relied upon for generating the curtain of air around fuel injected to the pre-chamber system by the pre-chamber fuel injector. As another example, maintaining current engine operating parameters may include maintaining air injection to pre-chamber system(s) of each engine cylinder off. Method 900 may then end. While depicted as ending, it may be understood that method 900 may be used to continually or repeatedly judge whether conditions are met for pre-chamber pressurization during a course of a drive cycle.

Returning to 910, responsive to conditions being indicated to be met for pre-chamber pressurization, method 900 proceeds to 920. At 920, method 900 includes supplying air to the pre-chamber system as a function of engine operating conditions. For example, responsive to conditions being indicated to be met, the controller may determine air injection parameters including but not limited to time for initiation of air injection, duration of air injection, amount of air injection, etc. Then, at 920, method 900 may include controlling the injection of air to the pre-chamber system accordingly, for example via exerting control over a duty cycle of the air injection control valve.

Proceeding to 925, method 900 includes indicating whether conditions are met for discontinuing pre-chamber pressurization. If not, then method 900 returns to 920 where air injection to the pre-chamber system continues. Alternatively, in response to conditions being met for discontinuing pre-chamber pressurization, method 900 proceeds to 930. At 930, method 900 includes discontinuing supplying air to the pre-chamber system. For example, the air injection control valve (e.g., air injection control valve 308 at FIG. 3) may be commanded fully closed. Method 900 may then end.

Turning now to FIG. 10, depicted is a prophetic example timeline 1000, illustrating how the methodology of FIG. 8 and FIG. 9 may be used to control air injection for an engine that includes a pre-chamber system with air injection capabilities, such as the pre-chamber system of FIG. 3. Timeline 1000 is discussed with regard to a single engine cylinder for brevity and clarity, however it may be understood that similar timelines apply to any number of engine cylinders that include associated pre-chamber systems of the present disclosure. Timeline 1000 includes plot 1005, indicating a position of the piston for a particular engine cylinder, over time. The piston may be at TDC, BDC, or somewhere in between. Also shown for reference is different strokes corresponding to piston position, including the intake stroke, compression stroke, power stroke, and exhaust stroke. Each stroke duration is defined by the double-sided arrow shown immediately below the particular stroke designation. Timeline 1000 further includes plot 1010, indicating whether the main chamber fuel injector (e.g., fuel injector 170 at FIG. 1) is on (injecting fuel) or off (not injecting fuel), over time. Timeline 1000 further includes plot 1015, indicating whether the pre-chamber fuel injector (e.g., fuel injector 166 at FIG. 1) is on, or off, over time. Timeline 1000 further includes plot 1020, indicating whether spark is being provided via the spark plug (e.g., spark plug 192 at FIG. 1) to the particular engine cylinder, over time. Timeline 1000 further includes plot 1025, indicating whether pre-chamber air injection is on (e.g., air is being injected via the air injector), or off (e.g., no air is being injected via the air injector), over time.

At time t0, the cylinder is just beginning the intake stroke, and thus the position is at TDC. Main chamber fuel injection as well as pre-chamber fuel injection are off (plots 1010 and 1015, respectively), spark is not being currently provided to the particular cylinder (plot 1020), and there is no air being injected via the air injector (plot 1025).

At time t1, fuel is injected via the main chamber fuel injector. It may be understood that such fuel injection may comprise port fuel injection, or direct fuel injection, depending on the particular engine configuration. At time t2, the fuel injection is discontinued. Between time t2 and t3, the piston travels from TDC to BDC, and begins returning to TDC. It may be understood that intake and exhaust valves may be controlled as is commonly known in the art during each engine stroke, and thus intake and exhaust valve status is not depicted for brevity.

At time t3, conditions are met for providing air injection via the pre-chamber air injector, and accordingly, air is commenced being injected. In this example, air injection is depicted as being "on" or "off", but it may be understood that this is exemplary and it may be possible to inject varying amounts of air (e.g., via controlling a duty cycle of the air injector control valve), as a function of any number of engine operating parameters. Air injection in this example is commenced as the piston begins traveling towards TDC, which may serve to pressurize the pre-chamber to prevent particulate, residuals, fuel, etc., from being pushed to the pre-chamber from the main chamber.

At time t4, fuel is injected to via the pre-chamber fuel injector (plot 1015), for a duration spanning time between time t4 and t5. With the air still being injected, it may be understood that the curtain of air produced by the air injector (e.g., air injector 210 at FIG. 3) exiting the air injector orifices (e.g., air injector orifices 210*b* at FIG. 3) may serve to reduce a spreading of the fuel injected via the pre-chamber fuel injector, which may reduce (or avoid) fuel hitting any surfaces prior to combustion in the pre-chamber. Additionally, the air injection may serve to improve a rate at which injected fuel is broken up into smaller droplets, and may still further serve to achieve smaller droplets than that which could otherwise be realized without the air injection as disclosed.

At time t6, spark is provided via the spark plug (e.g., spark plug 192 at FIG. 3). It may be understood that the spark may ignite the air-fuel mixture in the pre-chamber, and the ignited air-fuel mixture may travel to the main chamber, where the fuel provided from the main fuel injector is ignited. Accordingly, after time t6, the piston travels back towards BDC during the power stroke. Between time t6 and t7, air injection continues. In some examples, air injection may be discontinued just after spark is provided (or an amount of air injection may be lowered), while the piston travels from TDC to BDC. However, in other examples including the example depicted at timeline 1000, the air injection continues. Continuing air injection may serve to encourage any residuals to exit the pre-chamber and migrate to the main chamber, and the vacuum drawn on the pre-chamber via the piston traveling in the direction of BDC may further serve to draw out any residuals and/or particulate matter from the pre-chamber system.

Air injection is further continued during the exhaust stroke prior to time t7. The air injection may serve to pressurize the pre-chamber as discussed, which may reduce or prevent residuals from being pushed back into the pre-chamber system. At time t7, conditions are no longer met for continuing air injection, and accordingly, air injection is discontinued at time t7.

Regarding the pre-chamber system, it may be understood that additive manufacturing may be used to generate all or some aspects of the pre-chamber systems disclosed herein, which may reduce complexity, improve space considerations, and improve overall operation of the pre-chamber system.

Furthermore, while the above description has focused on air injection to a pre-chamber system, it may be understood that air injection may not be limited to the pre-chamber systems of the present disclosure. For example, it is herein recognized that similar air injection systems may be useful for introducing air directly into the main chamber (for a cylinder that includes or does not include an associated pre-chamber system). Such technology may be realized via the use of additive manufacturing, for example, similar to that discussed herein for the pre-chamber system. This may enable improved fuel droplet size and reduced cylinder wall wetting in a combustion chamber of, for example, a gasoline turbo direct injection engine (GTDI) that may not include pre-chamber systems.

In this way, via the use of air injection to the pre-chamber system, fuel economy may be improved, emissions may be reduced, and engine lifetime may be improved.

The technical effect of providing a rotating or swirling curtain of air to a pre-chamber system is that fuel interacting with the injected air may be prevented from hitting walls of the pre-chamber system prior to being combusted in the pre-chamber. In a case where walls of the surfaces leading to the pre-chamber are wetted by fuel, that fuel has to be evaporated, leading to the fuel not mixing with air as optimally as desired. The pre-chamber systems of the present disclosure reduce such an occurrence, thereby improving mixing. Another technical effect is that smaller fuel droplets in the pre-chamber may be achieved, which may be advantageous in terms of fuel economy and emissions, as opposed to other systems that do not include pre-chamber air injection. Yet another technical effect of enabling air injection to the pre-chamber systems of the present disclosure is to enable cleaning or purging operations of the pre-chamber system, by pressurizing the pre-chamber system which may purge residual aspects (e.g., particulate matter) out of the pre-chamber. The technical effect of purging residuals out of the pre-chamber is that subsequent air-fuel mixtures in the pre-chamber may undergo robust combustion.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   determining conditions for pre-chamber pressurization are met; and
   responsive to determining the conditions for pre-chamber pressurization are met, supplying an air flow to a pre-chamber system of an engine via an air injector system at a first predetermined time while a piston of a main chamber of the engine is undergoing reciprocating motion, the pre-chamber system including a pre-chamber fuel injector and a spark plug for igniting an air-fuel mixture within the pre-chamber system, and one or more pre-chamber orifices that fluidically couple the pre-chamber system to the main chamber.

2. The method of claim 1, wherein supplying the air flow further comprises controlling a duty cycle of an air injection control valve included in an air injector line of the air injector system.

3. The method of claim 1, further comprising supplying a first fuel to the main chamber via a main chamber fuel injector at a second predetermined time while the piston of the main chamber is undergoing reciprocating motion.

4. The method of claim 3, further comprising supplying the first fuel via port injection to the main chamber.

5. The method of claim 1, further comprising determining that the conditions for pre-chamber pressurization are not met, and responsive to determining the conditions for pre-chamber pressurization are not met, supplying a first fuel via direct injection to the main chamber and generating a curtain of air around the first fuel via the air injector system.

6. The method of claim 3, wherein the first predetermined time includes a time when fuel injection via one or both of the pre-chamber fuel injector and the main chamber fuel injector is discontinued.

7. The method of claim 1, further comprising supplying a second fuel to the pre-chamber system via the pre-chamber fuel injector at a third predetermined time while the piston of the main chamber is undergoing reciprocating motion.

8. The method of claim 7, wherein the first predetermined time is within a threshold time before the third predetermined time; and
   wherein the air flow is continued to be supplied at the third predetermined time when the second fuel is supplied to the pre-chamber system via the pre-chamber fuel injector.

9. The method of claim 7, further comprising supplying the second fuel at a predetermined angle with respect to a central axis of the pre-chamber fuel injector.

10. The method of claim 1, further comprising providing a spark to the pre-chamber system at a fourth predetermined time.

11. A system for an engine, comprising:
    a pre-chamber system that includes a pre-chamber fuel injector, a spark plug, a pre-chamber and an air injector each included within a pre-chamber housing;
    an air injector control valve for regulating a supply of air to the air injector;
    a main chamber that includes at least a piston and an associated main chamber fuel injector, the main chamber fluidically coupled to the pre-chamber housing by one or more pre-chamber orifices; and
    a controller with computer readable instructions stored on non-transitory memory that when executed, cause the controller to:
        responsive to determining that conditions for pressurizing the pre-chamber housing are met, with the piston undergoing reciprocating motion, inject an air flow to the pre-chamber system at a position between a tip of the pre-chamber fuel injector and the main chamber by controlling a duty cycle of the air injector control valve to pressurize the pre-chamber housing.

12. The system of claim 11, wherein the tip of the pre-chamber fuel injector includes a single spray hole for providing fuel to the pre-chamber system; and
    wherein the single spray hole is of a diameter within a range of 50-70 microns.

13. The system of claim 12, wherein fuel exits the single spray hole at a predetermined angle with respect to a central axis of the pre-chamber fuel injector.

14. The system of claim 11, wherein the air injector includes an air injector scaffold and a plurality of air injector orifices extending from the air injector scaffold, the air injector scaffold and the plurality of air injector orifices positioned directly between the tip of the pre-chamber fuel injector and the main chamber; and wherein the air injector scaffold and the plurality of air injector orifices extend generally circumferentially around at least part of an outer perimeter of the tip of the pre-chamber fuel injector so as to introduce a swirling or rotating pattern of the air flow.

15. The system of claim 14, further comprising a ring-like venturi element positioned just below the plurality of air injector orifices between the plurality of air injector orifices and the main chamber, the ring-like venturi element configured to further encourage the swirling or rotating pattern of the air flow exiting the plurality of air injector orifices.

16. The system of claim 11, further comprising an air injector line that extends from the air injector and which receives air from an air supply system; and
    wherein the air injector control valve is included within the air injector line.

17. A method comprising:
    determining pre-chamber pressurization conditions are met; and
    responsive to determining the pre-chamber pressurization conditions are pressurizing a pre-chamber of a pre-chamber system that is fluidically coupled to a main chamber of an engine that includes a piston by supplying an air flow to the pre-chamber system, to reduce a flow of residual material from the main chamber back to the pre-chamber under conditions where the piston is undergoing a reciprocating motion, wherein the pre-chamber pressurization conditions are different than air injection conditions for fuel combustion events.

18. The method of claim 17, wherein pressurizing the pre-chamber includes supplying an air flow to the pre-chamber via an air injector that includes one or more air injector orifices.

19. The method of claim 18, wherein pressurizing the pre-chamber further comprises controlling a duty cycle of an air injector control valve positioned within an air injector line that stems from the air injector.

20. The method of claim 17, further comprising pressurizing the pre-chamber at least when the piston is traveling from a bottom dead center position to a top dead center position.

* * * * *